Figure 3:
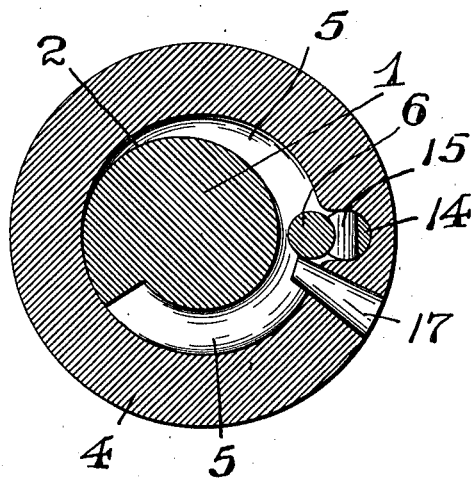

W. S. NICHOLS & J. H. GEORGE.
BALL BEARING SCREW.
APPLICATION FILED JUNE 22, 1910.
992,897.
Patented May 23, 1911.
2 SHEETS—SHEET 1.
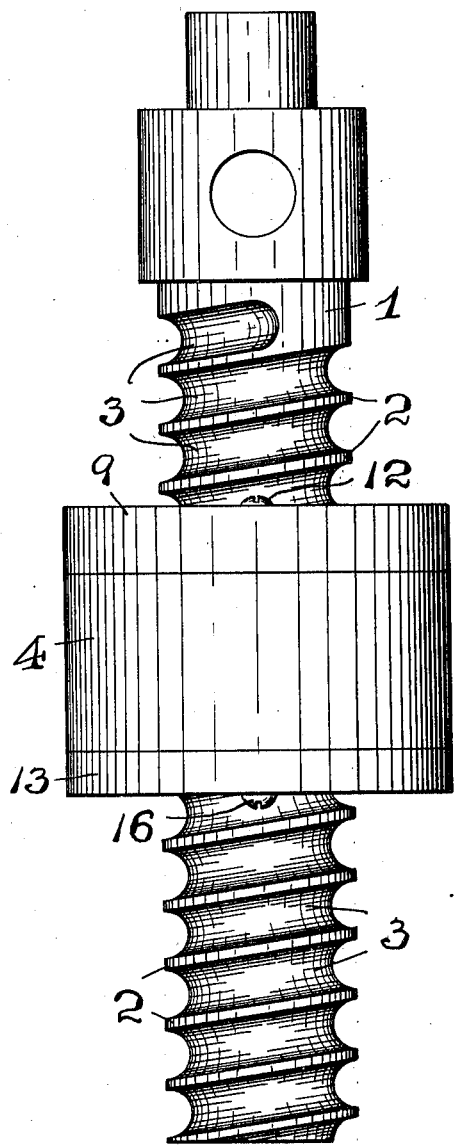
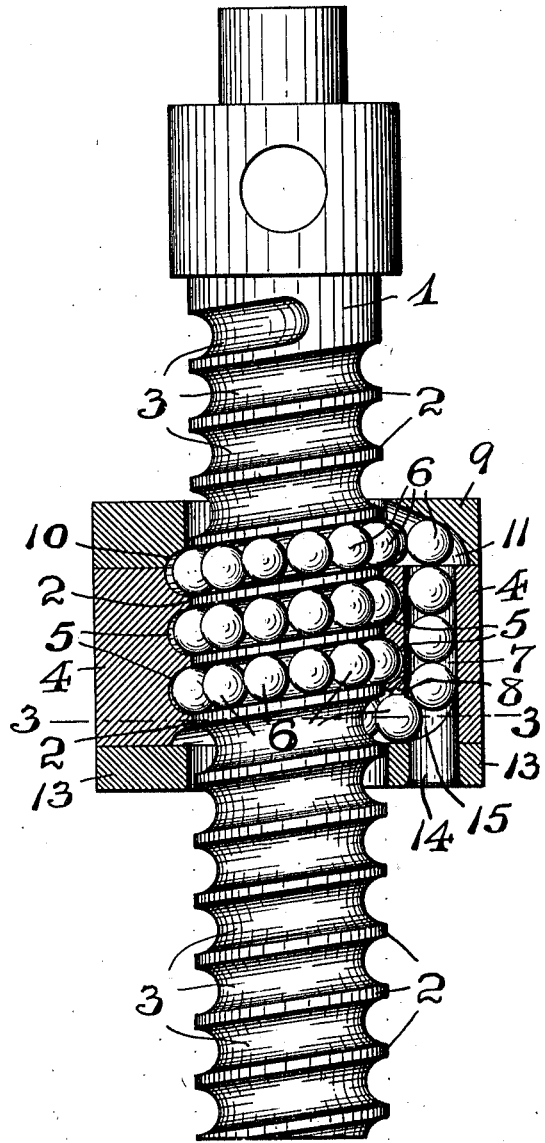
Fig. 1.
Fig. 2.
WITNESSES:
INVENTORS:
Winfield S. Nichols
James H. George
BY
Fraentzel and Richards,
ATTORNEYS W. S. NICHOLS & J. H. GEORGE.
BALL BEARING SCREW.
APPLICATION FILED JUNE 22, 1910.

992,897.

Patented May 23, 1911.

2 SHEETS—SHEET 2.

WITNESSES:
Fredk H. W. Fraentzel
Harry E. Pfeiffer

INVENTORS:
Winfield S. Nichols,
James H. George.
BY
Fraentzel and Richards,
ATTORNEYS

UNITED STATES PATENT OFFICE.

WINFIELD S. NICHOLS, OF NEWARK, AND JAMES H. GEORGE, OF HARRISON, NEW JERSEY, ASSIGNORS OF ONE-THIRD TO SAID WINFIELD S. NICHOLS, ONE-THIRD TO SAID JAMES H. GEORGE, AND ONE-THIRD TO HERBERT J. SKIPP, OF NEWARK, NEW JERSEY.

BALL-BEARING SCREW.

992,897.  Specification of Letters Patent.  Patented May 23, 1911.

Application filed June 22, 1910.  Serial No. 568,289.

*To all whom it may concern:*

Be it known that we, WINFIELD S. NICHOLS and JAMES H. GEORGE, citizens of the United States, residing at Newark, in the county of Essex and State of New Jersey, and at Harrison, county of Hudson, and State of New Jersey, respectively, have invented certain new and useful Improvements in Ball-Bearing Screws; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in non-friction screws and nuts; and, the invention relates, more particularly, to a novel and simply constructed device in the form of a screw and nut for reducing to a minimum the friction between screws and their nuts.

The invention has for its principal object to provide a novel construction of ball-bearing screw and nut, the plurality of balls being so disposed that they readily reduce the friction whether the screw moves within the nut, or the nut upon the screw.

The present invention is particularly adapted for use in connection with screw-jacks, press-screws, and all other kinds of mechanical devices wherein an easy running and frictionless screw-element is desirable.

Other objects of this invention not at this time more particularly enumerated will be clearly understood from the following detailed description of our present invention.

This invention consists, primarily, in the construction of a non-friction screw and nut hereinafter fully set forth; and, the invention consists, furthermore, in the novel arrangements, and combinations of the various devices and parts, as well as in the details of the construction of the same, all of which will be hereinafter more fully described and then finally embodied in the clauses of the claims which are appended to and which form an essential part of this specification.

The invention is clearly illustrated in the accompanying drawings, in which:—

Figure 5:
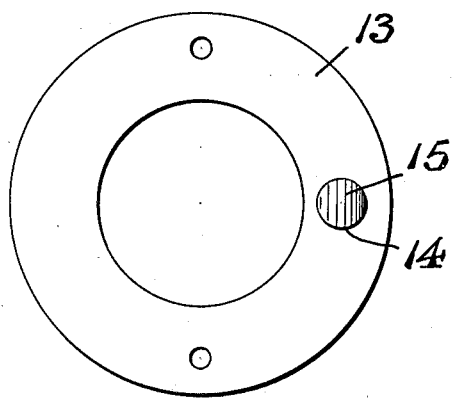
Figure 4:
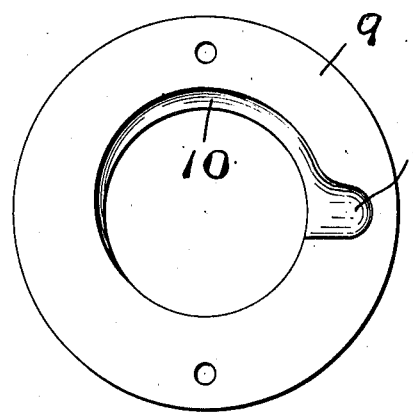
Figure 6:
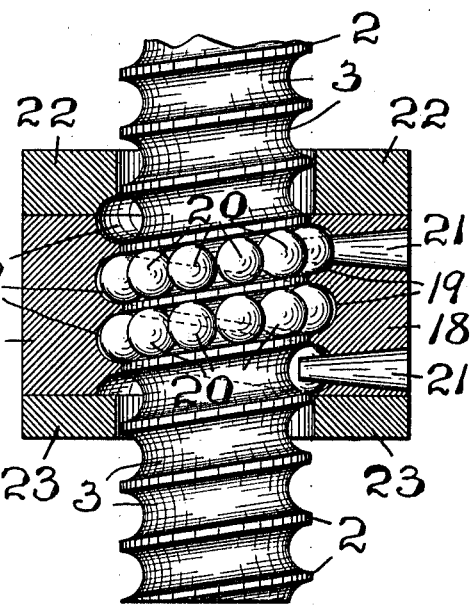

Figure 1 is a side elevation of a screw and nut embodying the principles of the present invention. Fig. 2 is a longitudinal vertical section of the same. Fig. 3 is a horizontal cross-section of the same, taken on line 3—3 in said Fig. 2, looking in a downwardly direction. Fig. 4 is a plan view of the inner side of the top-retaining plate of said nut. Fig. 5 is a plan view of the inner side of the bottom-retaining plate of said nut. Fig. 6 is a detail longitudinal vertical section of a slightly modified construction of screw and nut embodying, however, the principles of the present invention.

Similar characters of reference are employed in all of the hereinabove described views to indicate corresponding parts.

Referring now to the said drawings, the reference-character 1 indicates a screw-shank, the same being provided with screw-threads 2. Said screw-threads 2 are formed preferably with semi-circular bottoms 3, but we do not confine ourselves to such form, as it may be desirable in some instances to provide angular bottoms, or some other conformation. The said screw-thread 2 of the screw-shank 1, thus provided, is adapted to be operatively engaged by a nut-portion, comprising, a main body-member 4 provided with an internal semi-circular spiral groove 5, corresponding in pitch to the pitch of said screw-thread 2 of the screw-shank 1. This semi-circular spiral groove 5 of said main body-member 4 registers in position with said semi-circular bottom 3 of said screw-threads 2. Arranged in said semi-circular spiral groove 5, so as to move freely therein, are a plurality of anti-friction balls 6. The said anti-friction balls 6 project into said semi-circular bottom 3 of said screw-thread 2, thus forming the internal bearing of said screw-thread. Said main body-member 4 is further provided, in a convenient location, with a vertically extending tubular opening 7, and extending at right angles from the lower portion of said tubular opening 7 is a hole or passage 8 leading to and registering with a portion of said semi-circular bottom 3 of said screw-thread 2. Said main body-member 4 is provided at its upper end with a top-retaining plate 9 adapted to register therewith, the same being provided with a portion of spiral grooving 10 adapted to register with and continue from the upper end of said spiral groove 5 of said main body-member 4. The end of said portion of spiral grooving 10 terminates in a cut-out portion 11 which registers with the upper end of said tubular opening 7 of said main body-member 4. Said top-retaining plate 9 may be secured in its registered position with relation to said main body-member 4 in any suitable manner, such, for example, as fastening screws 12. Said main body-member 4 is still further provided with a bottom-retaining plate 13 adapted to register therewith. Said bottom-retaining plate 13 is provided with a guide-pin 14, so located, as to project upwardly into the lower end of said tubular opening 7 thereof. The upper or inwardly projecting end of said guide-pin 14 is provided with a concave chamfered portion 15 which serves to guide said anti-friction balls 6 upwardly through into said tubular opening 7. Said bottom-retaining plate 13 may be secured in its registered position with relation to said main body-member 4 in any suitable manner, such, for example, as fastening-screws 16. Arranged in said main body-member 4 is an inwardly extending stop-pin 17, the inner end of which projects into said semi-circular bottom 3 of said screw-thread 2, at a point adjacent to one side of said hole or passage 8, the same serving to stop said anti-friction balls 6 in front of said hole or passage 8 so that said anti-friction balls will pass thereinto and thence upwardly through said tubular opening 7.

From the foregoing description and an inspection of the drawings, it will be clearly evident, that the said anti-friction balls 6 form a rolling bearing which operatively contacts with the screw-thread 2 of said screw-shank 1. When said screw-shank 1 is turned to pass downwardly through said nut-portion, or the nut-portion travels upwardly on said screw-shank, the said screw-thread 2 engages said anti-friction balls which have not only an individual revolving movement but which have also a rolling movement downwardly through said semi-circular spiral groove 5 of said main body-member 4, this downward rolling movement continues until the stop-pin 17 is reached whereupon the anti-friction balls 6 are forced through the hole or passage 8 and are guided upwardly by the concave chamfered end 15 of said guide-pin 14 into said tubular opening 7, through which they pass, the same being guided back into said spiral groove 5 by the cut-out portion 11 and spiral grooving 10 of said retaining plate 9. Thus it will be seen, that the anti-friction balls 6 circulate with a rolling movement around the screw-threaded shank 1, thus causing the same to travel smoothly, easily and quickly through said nut-portion, no matter how heavy the load carried or supported thereby, and thus practically eliminating the great binding friction which is the usual accompaniment of the uses of screws in many classes of work.

Referring now more particularly to Fig. 6 of the drawings, we have illustrated therein a slightly modified construction of our invention. In this construction, we provide a nut-portion comprising a main body-member 18 provided with an internal semi-circular spiral groove 19, corresponding in pitch to the pitch of said screw-thread 2 of the screw-shank 1, the said spiral groove 19 registering in position with semi-circular bottom 3 of said screw-thread 2. Arranged in said spiral groove 19 are a plurality of anti-friction balls 20, the same projecting into said semi-circular bottom 3 of said screw-thread 2 and forming the internal bearing of said screw-thread. Said main body-member 18 is provided with a pair of stop-pins 21, the inner ends of which extend into said spiral groove 19, respectively, at each end of said line of anti-friction balls 20, thus retaining the same in a fixed position with reference to the portion of spiral groove 19 they respectively occupy. A top-retaining plate 22 and a bottom-retaining plate 23 may be secured to the respective upper and lower ends of said main body-member 18 as desired. In this construction the said anti-friction balls do not possess a rotary or traveling movement around said screw-shank 1, but have simply their individual rolling or revolving movement in a practically fixed position both with relation to said screw-shank and said nut-portion. This construction commends itself to same classes of work, and is slightly simplified in construction and operation, yet at the same time possessing a non-friction attribute.

We are fully aware that changes may be made in the general arrangements and combinations of the devices and parts without departing from the scope of our present invention as described in the specification and as defined in the claims appended to said specification. Hence, we do not limit this invention to the exact arrangements and combinations of the various parts as set forth in the specification, nor do we confine ourselves to the exact details of the construction of the said parts as illustrated in the accompanying drawings.

We claim:

1. As a new mechanical element, a non-friction screw and nut comprising, a screw-shank provided with screw-threads, a nut-portion adapted to receive said screw-threads of said screw-shank, said nut-portion comprising a main body-member provided with an internal semi-circular spiral groove and a vertical tubular opening providing a return-passage, said main body-member being provided with a hole or passage connecting said spiral groove with the lower end of said vertical tubular opening, a stop-pin secured to said main body-member, the inner end of which projects into said spiral groove adjacent to said hole or passage, a top retaining plate provided with means for connecting the upper end of said tubular opening with said spiral groove, a bottom retaining plate provided with a guide-pin adapted to enter the lower portion of said tubular opening, and a plurality of anti-friction balls seated in said spiral groove and capable of a rolling or traveling movement in said spiral groove, said anti-friction balls being adapted to engage said screw-threads of said screw-shank and form the bearings therefor, substantially as and for the purposes set forth.

2. As a new mechanical element, a non-friction screw and nut comprising a screw-shank provided with screw-threads, a nut-portion adapted to receive said screw-threads of said screw-shank, said nut-portion comprising a main body-member provided with an internal semi-circular spiral groove and a vertical tubular opening providing a return-passage, said main body-member being provided with a hole or passage connecting said spiral groove with the lower end of said vertical tubular opening, a stop-pin secured to said main body-member, the inner end of which projects into said spiral groove adjacent to said hole or passage, a top retaining plate secured to the upper end of said main body-member, said top-retaining plate being provided with a cut-out portion registering with the upper end of said tubular opening, and a portion of said spiral grooving registering with the end of said spiral groove of said main body-member, a bottom retaining plate secured to the lower end of said main body-member, said bottom retaining plate being provided with a guide-pin, the upper end of said guide-pin being provided with a concave chamfered portion adapted to enter the lower end of said tubular opening, and a plurality of anti-friction balls seated in said spiral groove and capable of a rolling or traveling movement in said spiral groove, said anti-friction balls being adapted to engage said screw-threads of said screw-shank and form the bearings therefor, substantially as and for the purposes set forth.

In testimony, that we claim the invention set forth above we have hereunto set our hands this 18th day of June 1910.

WINFIELD S. NICHOLS.
JAMES H. GEORGE.

Witnesses:
FREDK. C. FRAENTZEL,
FREDK. H. W. FRAENTZEL.